(12) United States Patent
Felber et al.

(10) Patent No.: US 7,946,398 B2
(45) Date of Patent: May 24, 2011

(54) METHOD FOR ADJUSTING A BRAKING TORQUE AND PERMANENTLY EXCITED MAGNETIC HYSTERESIS BRAKE

(75) Inventors: Christian Felber, Sonthofen (DE); Christian Schmieger, Probstried (DE)

(73) Assignee: Oerlikon Textile GmbH & Co. KG, Monchengladbach (DE)

( * ) Notice: Subject to any disclaimer, the term of this patent is extended or adjusted under 35 U.S.C. 154(b) by 1038 days.

(21) Appl. No.: 11/708,999

(22) Filed: Feb. 21, 2007

(65) Prior Publication Data
US 2007/0199780 A1 Aug. 30, 2007

(30) Foreign Application Priority Data

Feb. 21, 2006 (DE) .................. 10 2006 007 924

(51) Int. Cl.
*B60L 7/00* (2006.01)
(52) U.S. Cl. .................................................... 188/164
(58) Field of Classification Search .................. 188/164, 188/158, 72.1, 156, 161; 192/48.2; 310/105
See application file for complete search history.

(56) References Cited

U.S. PATENT DOCUMENTS

| | | | | |
|---|---|---|---|---|
| 2,607,820 | A | 8/1952 | Judd et al. | 172/285 |
| 3,822,390 | A * | 7/1974 | Janson | 310/104 |
| 4,152,617 | A | 5/1979 | Janson | 310/103 |
| 4,445,058 | A * | 4/1984 | Janson | 310/103 |
| 5,051,638 | A * | 9/1991 | Pyles | 310/105 |
| 6,054,788 | A * | 4/2000 | Dombrovski et al. | 310/103 |
| 6,232,686 | B1 | 5/2001 | Schneider | 310/77 |

FOREIGN PATENT DOCUMENTS

| | | |
|---|---|---|
| DE | 11 14 917 | 10/1961 |
| DE | 28 45 738 A1 | 5/1979 |
| DE | 32 05 295 A1 | 8/1983 |
| DE | 37 32 766 A1 | 4/1988 |
| DE | 197 05 290 A1 | 9/1998 |
| DE | 103 13 855 A1 | 10/2004 |

OTHER PUBLICATIONS

German Search Report.

\* cited by examiner

*Primary Examiner* — Xuan Lan Nguyen
(74) *Attorney, Agent, or Firm* — K&L Gates LLP

(57) ABSTRACT

A permanently excited magnetic hysteresis brake (1) comprises a support roller (7) rotatable about a fixed axle (9), a magnetic element (3), a hysteresis element (2) and an adjusting device for adjusting the position of the magnetic element (3) and hysteresis element (2) relative to one another and for adjusting the braking torque acting via the support roller (7) on the yarn (5). The magnetic hysteresis brake (1) has only one single mechanically acting actuator (18) for adjusting the braking torque. Both the adjustment of the braking torque to the desired value for the operation of the brake (1) and the adjustment of the braking torque when calibrating the brake (1) are carried out by actuation of this one actuator (18). The structure and handling of the magnetic hysteresis brake (1) can be simplified thereby. The magnetic hysteresis brake (1) can be used to maintain a uniform thread tension on textile machines.

13 Claims, 7 Drawing Sheets

METHOD FOR ADJUSTING A BRAKING TORQUE AND PERMANENTLY EXCITED MAGNETIC HYSTERESIS BRAKE

CROSS-REFERENCE TO RELATED APPLICATIONS

This application claims the benefit of German patent application 10 2006 007 924.8, filed Feb. 21, 2006, herein incorporated by reference.

BACKGROUND OF THE INVENTION

The invention relates to a method for adjusting the braking torque of a permanently excited magnetic hysteresis brake by means of a mechanically acting actuator and a permanently excited magnetic hysteresis brake for carrying out such method.

Hysteresis brakes allow a uniform tension to be maintained without acting on the yarn with a friction which can damage the yarn. The yarn passes through the magnetic hysteresis brake at a predetermined speed. The yarn is thus guided via a roller, with it completely or partially looping the roller and being acted upon by the braking action of the magnetic hysteresis brake. The braking torque is independent of the rotational speed.

Hysteresis brakes are used in the textile industry, for example in the production of twisted yarn or the winding of yarn on bobbins.

German Patent Publication DE 19705290 A1 describes a permanent magnet-excited hysteresis brake with a roller, a hysteresis ring and a magnetic ring provided with magnetic poles. The hysteresis ring is rotationally fixed to the roller. The magnetic ring is fastened to a support part, which is axially displaceably mounted relative to the hysteresis ring by means of an adjusting device. The adjusting device comprises a thread attachment on the support part and a threaded spindle on an adjusting ring, which is axially fixed, but rotatable. By rotating the adjusting ring, the magnetic ring is displaced relative to the hysteresis ring. The displacement brings about a change in the braking torque of the hysteresis brake. The axial arrangement of the roller is adjusted by means of a central screw, which presses the roller against a central axial spring. The rotation of the screw allows a basic adjustment of the immersion depth of the magnetic ring in the hysteresis ring and therefore a calibration of the hysteresis brake. With the hysteresis brake from German Patent Publication DE 19705290 A1 it is necessary for the adjustment of the braking torque for the operation and for the adjustment of the braking torque during the calibration, to keep in readiness and actuate two different adjusting devices.

SUMMARY OF THE INVENTION

Proceeding from the aforementioned prior art, the invention is based on the object of improving the magnetic hysteresis brake for the adjustment of the braking torque.

This object is achieved by a method for adjusting a braking torque of a permanently excited magnetic hysteresis brake by means of a mechanically acting actuator. According to the invention, both the adjustment of the braking torque to a desired valued for the operation of the magnetic hysteresis brake and the adjustment of the braking torque when calibrating the magnetic hysteresis brake can be carried out by means of actuation of the same actuator.

The invention further provides a permanently excited magnetic hysteresis brake for carrying out such method, utilizing a support roller, which can be rotated about a fixed axle, with at least one magnetic element and at least one hysteresis element. The magnetic element and the hysteresis element are separated from one another by an air gap. An adjusting device enables adjustment of the position of the magnetic element and hysteresis element relative to one another. Therefore, the torque with which the support roller is acted upon as a braking torque can be adjusted. The adjusting device comprises an actuator which can be rotated about the axle. According to the invention, the magnetic hysteresis brake has only a single actuator, with which the braking torque can be adjusted both for the operation of the magnetic hysteresis brake and during the calibration of the magnetic hysteresis brake.

The additional components such as separate actuators and adjusting devices for the calibration required in the previously known magnetic hysteresis brake for adjusting the braking torque to a desired value for the operation of the magnetic hysteresis brake are dispensed with in the magnetic hysteresis brake according to the invention and the costs for them are saved. Handling of the magnetic hysteresis brake is simplified.

If the actuator has a scale and the magnetic hysteresis brake comprises a cover, which carries a marking, and if the scale and the marking are arranged such that they cooperate as a display device, precise and reproducible adjustment of certain braking torques is possible.

The magnetic hysteresis brake advantageously has a connection between the cover and the axle, which is released or fixed as a function of the respective adjusting process. To adjust a braking torque for the calibration process, the connection is released and the actuator and the cover are rotatable together about the fixed axle. To adjust a braking torque for operation, the cover is rigidly connected to the axle, while the actuator can be rotated relative to the now fixed cover. Thus it is possible in a simple manner to carry out the adjustment of the braking torque in the two adjusting processes with only a single actuator.

A screw connection is a simple and reliable connection, which can be released with little effort, between the cover and the axle.

In a coupling, which is preferably configured as a latching connection, between the lid and actuator, the force exerted by the coupling is large enough to entrain the cover when adjusting a braking torque for the calibration process when the actuator is rotated about the fixed axle, so no rotation takes place between the actuator and cover. The force which can be exerted by the latching connection is small enough when adjusting or setting a braking torque for operation to be able to rotate the actuator by hand relative to the cover, which is rigidly connected to the fixed axle. Owing to the coupling, the actuator remains locked in the respectively adjusted position with respect to the cover. An adjusting ring as an actuator allows a compact configuration of the magnetic hysteresis brake.

The hysteresis element is preferably rigidly connected to the support roller and the magnetic element is fastened to a holder, which is rotationally fixed with respect to the fixed axle and displaceable relative to the hysteresis element by means of the adjusting device in the axial direction of the fixed axle. The actuator and the holder advantageously have a thread in each case, and the threads mesh with one another in such a way that a rotation of the actuator brings about an axial displacement of the holder.

In an alternative embodiment, the hysteresis element is rigidly connected to the support roller and the magnetic element is fastened to a holder which is coupled so as to be rotatable about the fixed axle and rotationally fixed to the actuator and which is displaceable by means of the adjusting device relative to the hysteresis element in the axial direction of the axle. The adjusting device advantageously comprises a cam disc which is carried by the axle and has at least one ramp, the holder being supported on the ramp and the cam disc being configured and arranged such that a rotation of the holder brings about an axial displacement of the holder. The surface of the ramp preferably extends helically about the axle. In the use of a cam disc, in comparison to a thread, a significantly lower adjusting force is required.

These known embodiments allow reliable and precise adjustment of the braking torque of the magnetic hysteresis brake and are a simple and space-saving with regard to structure.

If the air gap between the magnetic element and the hysteresis element lies in a plane transverse to the fixed axle, a compact arrangement of the hysteresis ring and magnetic ring is possible.

The magnetic hysteresis brake according to the invention can be produced in a compact and economical manner and allows simple handling.

BRIEF DESCRIPTION OF THE DRAWINGS

The invention will be described in more detail with the aid of the figures, in which.

DETAILED DESCRIPTION OF THE PREFERRED EMBODIMENTS

Figure 1:
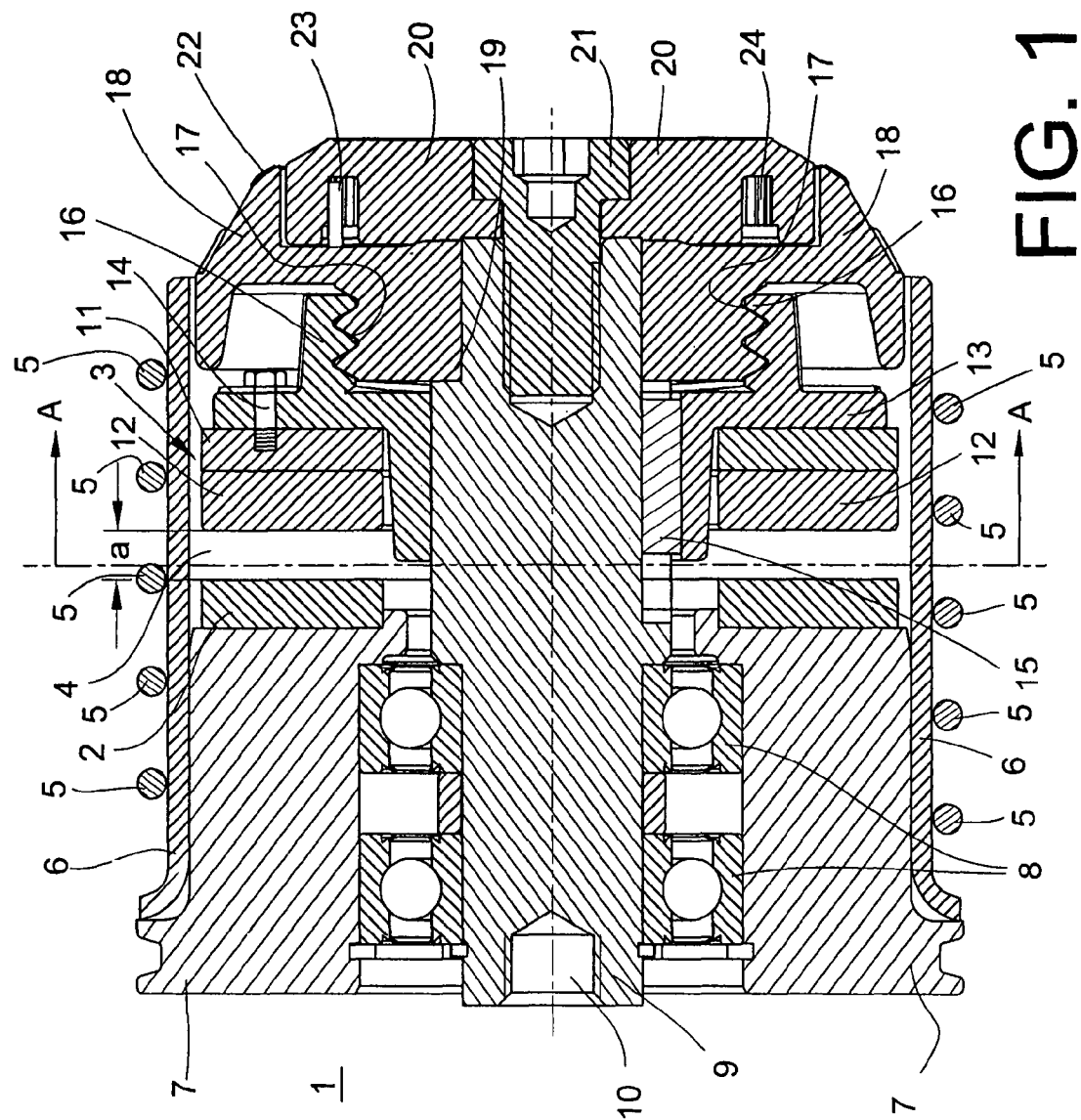
FIG. 1 shows a longitudinal section through a magnetic hysteresis brake according to the invention.

FIG. 1 shows the operating position of the magnetic hysteresis brake 1 according to the invention. The magnetic hysteresis brake 1 has a hysteresis element configured as a hysteresis ring 2 and a magnetic element 3. The hysteresis ring 2 and the magnetic element 3 are spaced apart from one another by an air gap 4.

Figure 2:
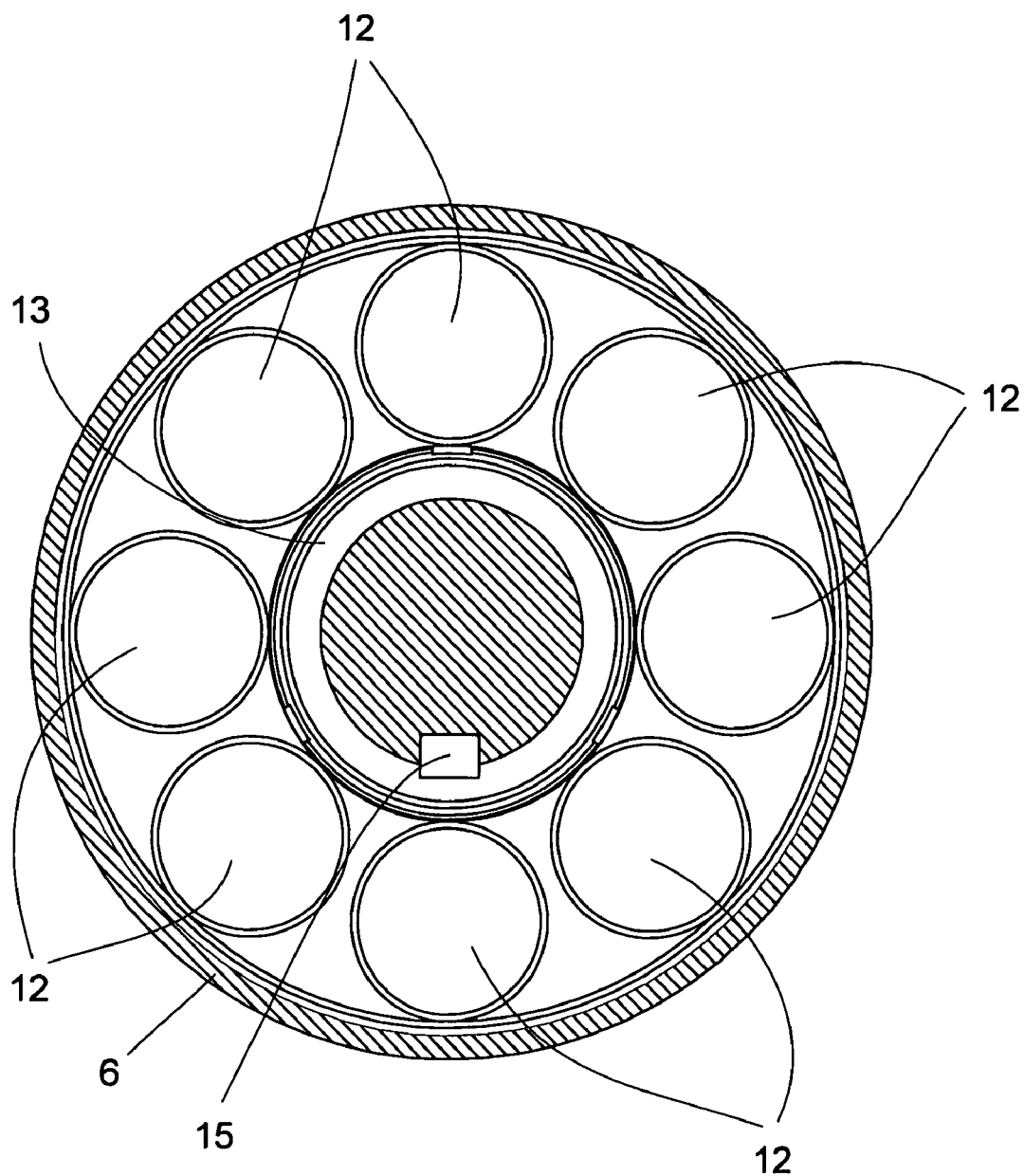
FIG. 2 shows a cross-section A-A through the magnetic hysteresis brake of FIG. 1.
Figure 3:
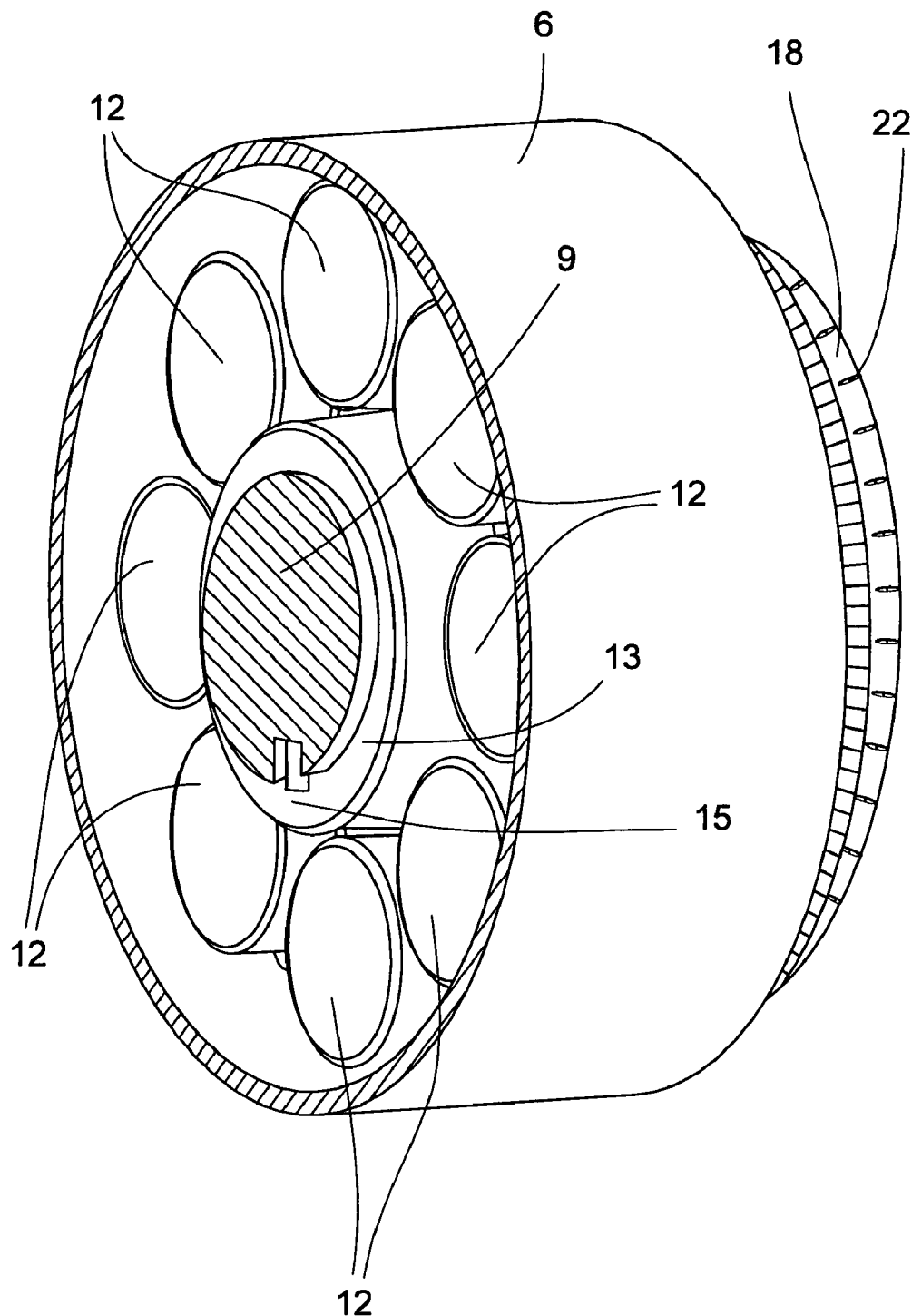
FIG. 3 shows a perspective view of the cross-section of FIG. 2.
Figure 4:
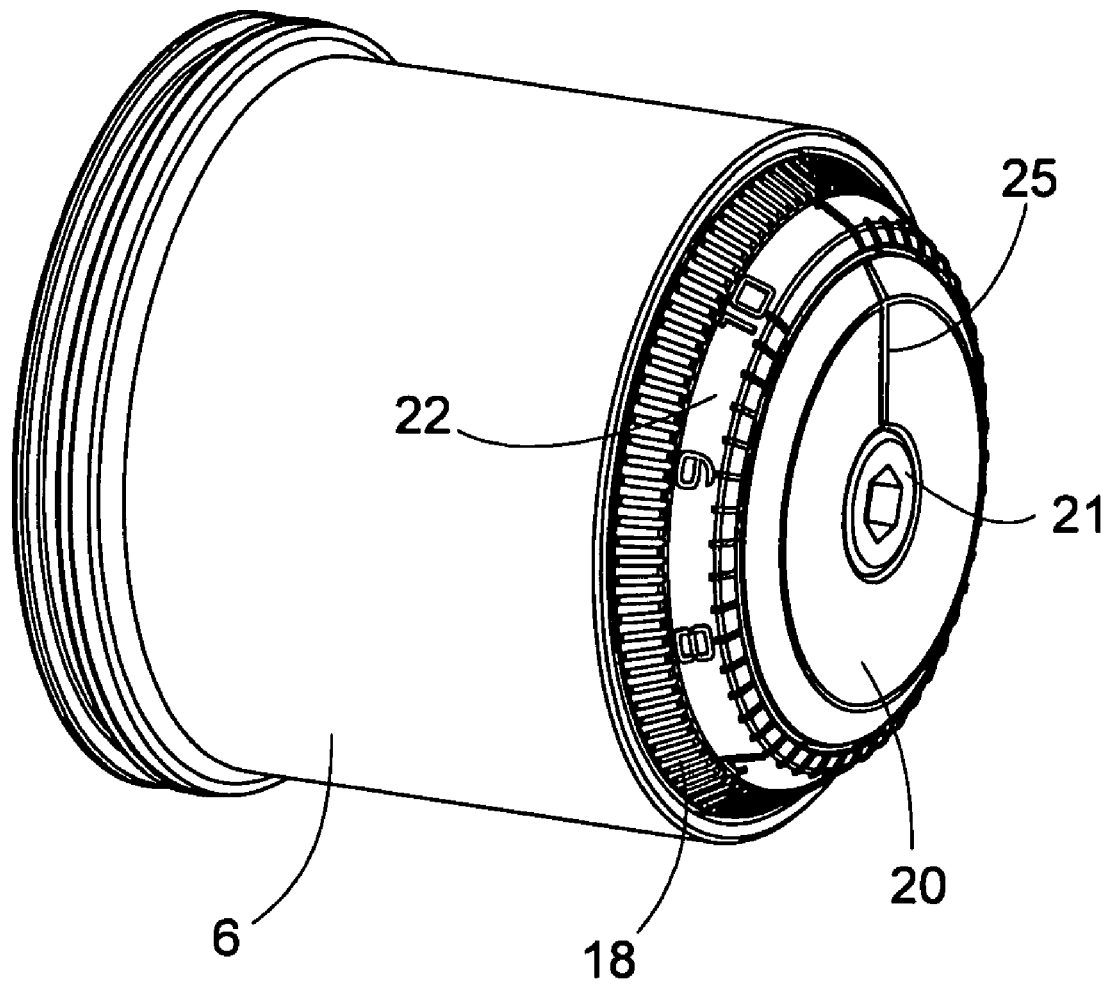
FIG. 4 shows a perspective view of the end face of the magnetic hysteresis brake of FIG. 1.

The spacing a between the hysteresis ring 2 and magnetic element 3 can be changed by means of an adjusting device. The smaller the spacing a, the greater is the braking torque, with which the magnetic hysteresis brake 1 acts on the running yarn 5. The running yarn 5 lies in one or, as shown in FIG. 1, in a plurality of loops on the casing tube 6, which is rotationally fixed to the support roller 7. The support roller 7 is rotatably mounted by means of two ball bearings 8 on the axle 9. A uniform thread tension, which depends on the adjusted braking torque with regard to its level is provided for the running yarn 5. The fixed axle 9 can be fastened by a screw connection by means of a threaded bore 10 to a stationary machine part of a textile machine, such as, for example a support arm or a frame part. The hysteresis ring 2 is rigidly connected by gluing to the support roller 7. The magnetic element 3 comprises a pole disc 11 and permanent magnets configured as round magnets 12, which are fixed to the pole disc 11. The round magnets 12 are symmetrically arranged about the axle 9, as shown in FIGS. 2 and 3. The magnetic element 3 is fastened to a holder 13 by means of screws 14. The holder 13 is axially displaceable on the axle 9. A feather key 15 secures the holder 13 against rotation on the axle 9. The holder 13 has an inner thread 16, which engages in the thread of a threaded spindle 17. The threaded spindle 17 is part of an actuator configured as an adjusting ring 18. The adjusting ring 18 is rotatable on the axle 9 and not axially displaceable thereon. An axial movement of the adjusting ring 18 is prevented, on one side, by the step 19 of the axle 9 and, on the other side, by the cover 20. Both the cover 20 and the adjusting ring 18 consist of plastics material. In the view of FIG. 1, the cover 20 is fixed at the free end of the axle 9 by means of a hexagon socket screw 21. The adjusting ring 18 has a scale 22 and can be rotated relative to the cover 20. By means of a latching, the respective position of the adjusting ring 18 can be reproducibly adjusted. The cover 20 comprises flutes 24 which are arranged circumferentially similar to an internal ring gear. A resilient tongue 23 of the adjusting ring 18 engages in the flutes 24. The coupling, adjusting ring 18 and cover 20, are coupled with the latching connection, which is formed by the engagement of the resilient tongue 23 in the flutes 24. The resistance with which the coupling counteracts the manual rotation of the adjusting ring 18 is slight and easy to overcome. The tongue 23, on ending the rotation of the adjusting ring 18, in each case latches in a flute 24. The latching allows an exact reducibility of the selected adjustment of the breaking torque. The scale 22, together with a marking arrow 25 applied to the cover 20, forms a display device. The marking arrow 25 shows the level of the respectively adjusted braking torque on the scale 22. FIG. 1 represents the operating state of the magnetic hysteresis brake 1, in which the braking torque of the magnetic hysteresis brake 1 can be adjusted to a desired value. For adjustment, the adjusting ring 18 is rotated such that the marking arrow 25 points to the desired value on the scale 22. If the adjusting ring 18 is adjusted anti-clockwise in the view of FIG. 4, the holder 13 in the view of FIG. 1 is displaced to the left by this rotation via the threaded spindle 17 and the inner thread 16. The spacing a, which represents the width of the air gap 4 between the round magnets 12 and the hysteresis ring, thus becomes smaller, the slip power of the magnetic hysteresis brake 1 increases and the braking torque of the magnetic hysteresis brake 1 becomes larger. Accordingly, the braking torque on rotation of the adjusting ring 18 in the clockwise direction becomes smaller as the displacement of the holder 13 now increases the spacing a.

Most parts of the magnetic hysteresis brake 1 are surrounded and protected by the tubular casing tube 6.

Figure 5:
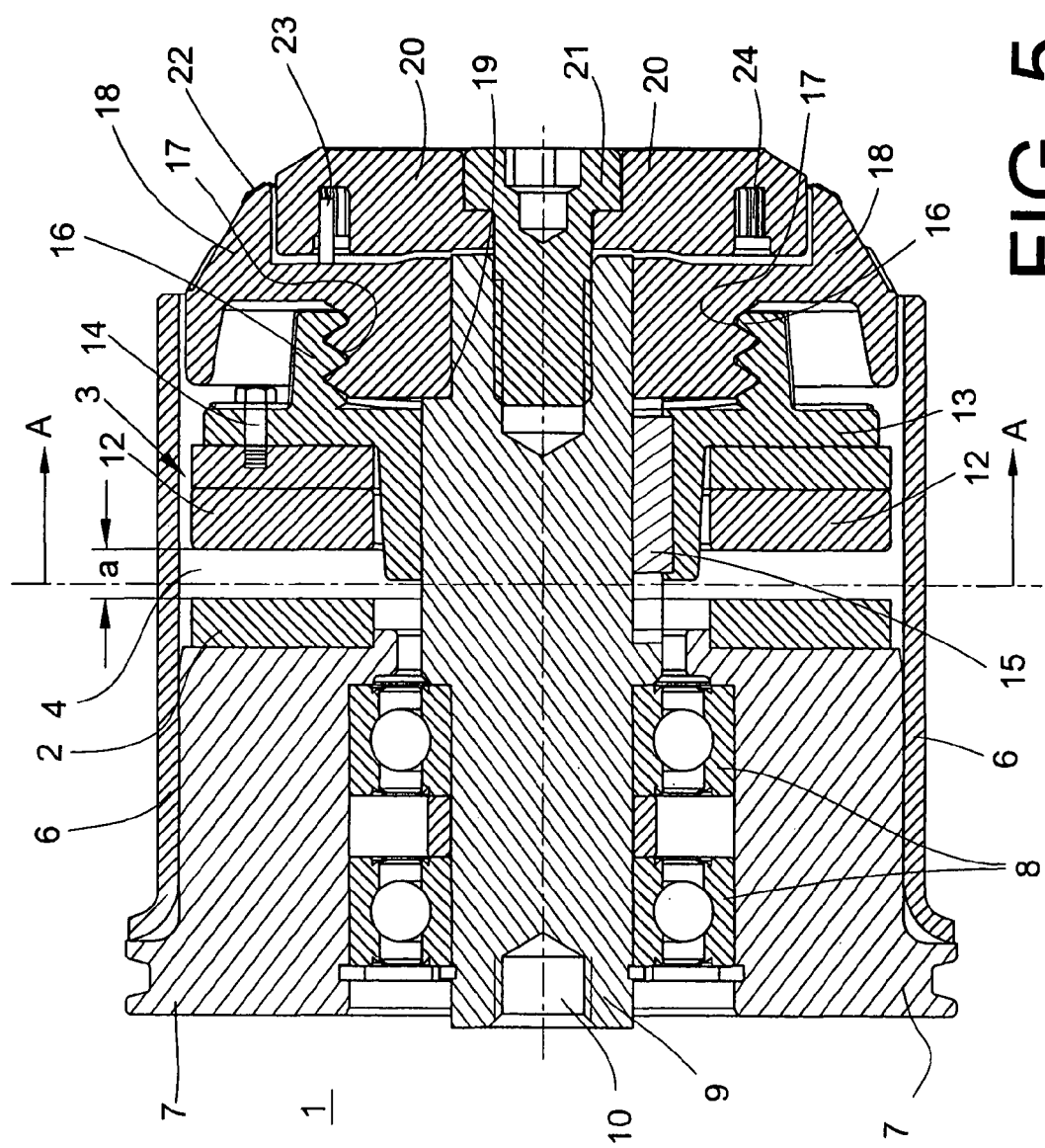
FIG. 5 shows the magnetic hysteresis brake according to the invention set up for the calibration process.

FIG. 5 shows the magnetic hysteresis brake 1 in the state prepared for the calibration process. In order to calibrate the magnetic hysteresis brake 1, a specific torque or braking torque is input for a specific scale position, for example the position 1. The specific torque or braking torque is, for example, 1 Ncm for the position 1. The adjusting ring 18 is now adjusted such that the marking arrow 25 points to the position 1 of the scale 22. The hexagon socket screw 21, which has until now fixed the cover 20 on the axle 9, is then released until the cover 20 can be rotated about the axle 9. If the adjusting ring 18 is now rotated, the spacing a between the magnetic element 3 and hysteresis ring 2 and therefore the braking torque generated by the magnetic hysteresis brake 1 is changed. The connection configured by the flutes 24 of the cover 20 and the resilient tongue 23 of the adjusting ring 18 as a latching device engages with a limited force on the cover 20. This force is, however, sufficient to synchronously also entrain the cover 20 upon a rotation of the adjusting ring 18.

While the braking torque changes owing to the rotation of the adjusting ring 18, the selected adjustment of the marking arrow 25 is retained at the determined position (position 1 in the example given above). The braking torque input for this position to calibrate the magnetic hysteresis brake 1 is adjusted precisely with the aid of a torque measuring apparatus, not shown. The hexagon socket screw 21 is tightened again and the cover 20 is fixed on the axle 9. The allocation of the input torque to the determined position is fixed in this manner. The input torque can be reproduced by adjustment to this position. The magnetic hysteresis brake 1 is therefore calibrated and prepared for operation.

In an alternative implementation of the calibration process, the cover 20 is initially not yet fitted. With the aid of a torque measuring apparatus, the input braking torque is adjusted by rotating the adjusting ring 18. The cover 20 is then placed on the free end of the axle 9 in such a way that the marking arrow 25 points to the position of the scale 22 corresponding to the braking torque. If the value of the adjusted braking torque is, for example 5 Ncm, the marking arrow points to the position 5 of the scale 22. By tightening the hexagon socket screw 21, the cover 20 is fixed to the axle 9 and the magnetic hysteresis brake 1 calibrated.

Figure 6:
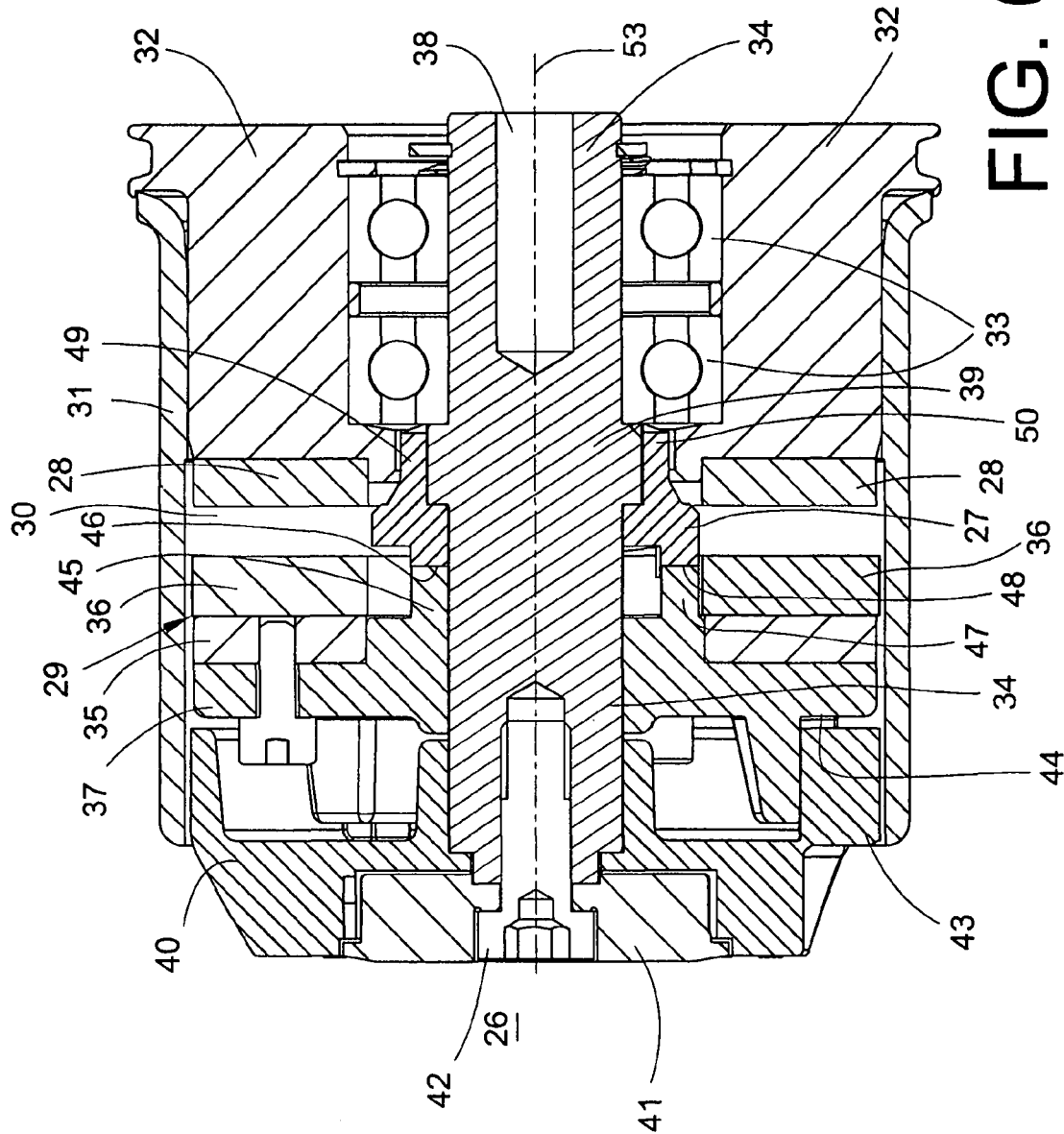
FIG. 6 shows the longitudinal section through a magnetic hysteresis brake with a cam disc.

FIG. 6 shows a magnetic hysteresis brake 26, which has a cam disc 27, in the operating position. The magnetic hysteresis brake 26 comprises a hysteresis element configured as a hysteresis ring 28 and a magnetic element 29, which are axially spaced apart from one another by an air gap 30. The magnetic element 29 is fastened to a holder 37. The axial spacing between the hysteresis ring 28 and magnetic element 29 can be adjusted by means of an adjusting device using the cam disc 27. The running yarn, not shown, lies in one or more loops on the casing tube 31. The casing tube 31 is rotationally fixed to the support roller 32, which is rotatably mounted by means of two ball bearings 33 on the axle 34. The hysteresis ring 28 is rigidly connected to the support roller 32. The magnetic element 29 comprises a pole disc 35 and permanent magnets configured as round magnets 36, which are fixed on the pole disc 35. The axle 34 fixed by means of a screw, not shown, screwed into the threaded bore 38, for example on a support arm or a frame part of a textile machine has a peripheral collar 39. The axle 34 carries the cam disc 27, the holder 37 and an actuator configured as an adjusting ring 40.

Figure 7:
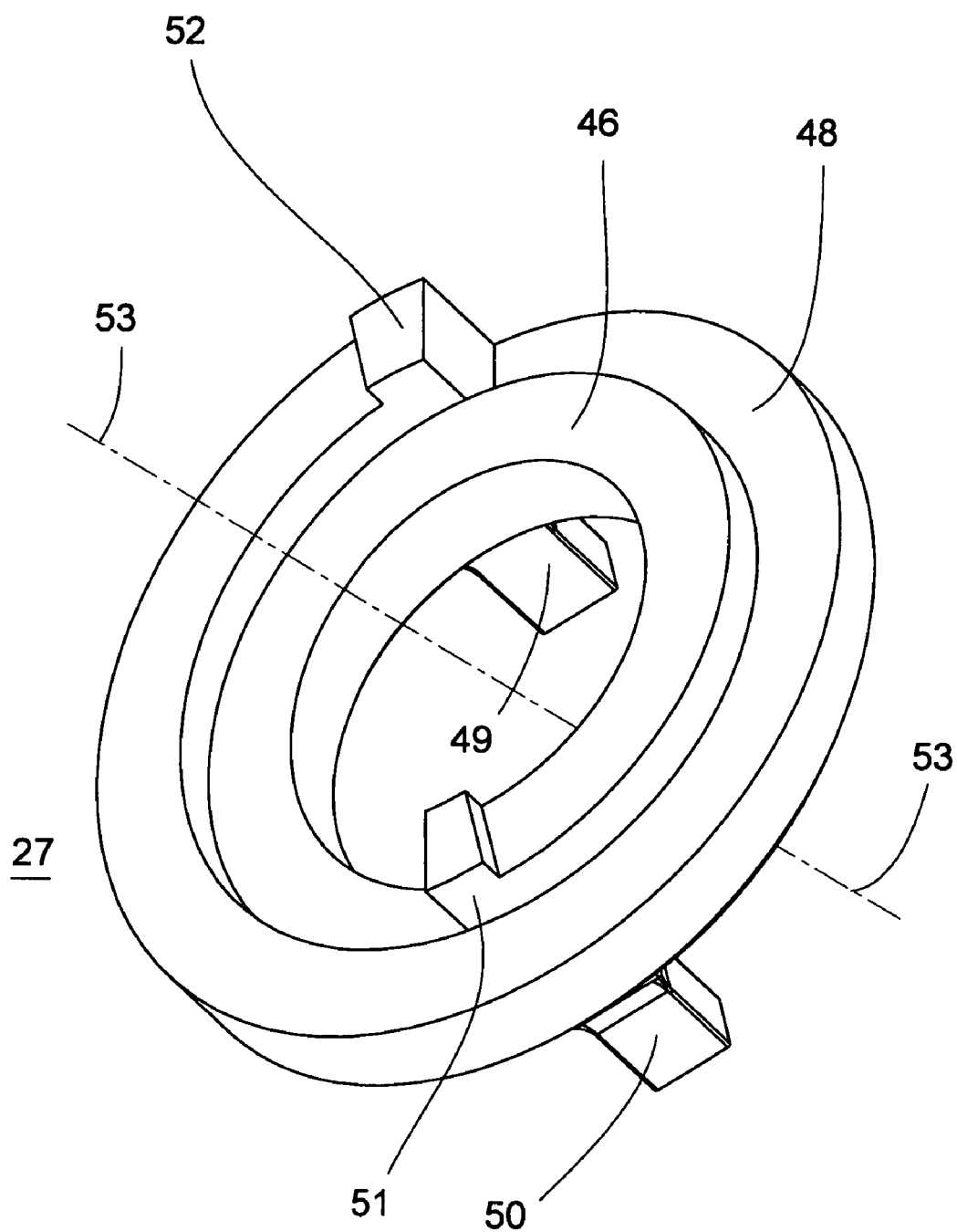
FIG. 7 shows the cam disc of FIG. 6 in a perspective view.

A cover 41 is fixed by means of a hexagon socket screw 42 to the free end of the axle 34 opposing the threaded bore 38. The cover 41 carries a marking and the adjusting ring 40 carries a scale in the manner shown in FIG. 4. The scale of the adjusting ring 40, together with the marking applied to the cover 41 forms a display device. The adjusting ring 40 is rotatably mounted on the axle 34. As long as the cover 41 is fixed by means of the hexagon socket screw 42, the adjusting ring 40 is not axially displaceable. The holder 37 is rotationally fixed to the adjusting ring 40 by a nose 43 of the adjusting ring 40, which engages in a groove 44 of the holder 37 but is, however, axially displaceable with respect to the adjusting ring 40 and rotatable about the axle 34. In this case, the holder 37 rests, under the action of the magnetic force, between the round magnets 36 and the hysteresis ring 28 with the cam 45 on the surface of the inner ramp 46 and with the cam 47 on the surface of the outer ramp 48 of the cam disc 27. The surface of the inner ramp 46 and the surface of the outer ramp 48 of the cam disc 27 extend helically around the axle 34 or around the centre line 53 as shown in FIG. 7. The cam disc 27 is rotationally fixed to the axle 34 by means of the journals 49, 50 and is axially supported under the action of the magnetic force applied by the holder 37 against the collar 39 of the axle 34. The stops 51, 52 limit the adjustment path of the cams 45, 47 on the surface of inner ramp 46 and the surface of the outer ramp 48 of the cam disc 27.

To adjust a specific torque or braking torque, the adjusting ring 40 is rotated about the centre line 53. On rotation of the adjusting ring 40 and the holder 37 rotationally fixed thereto, the holder 37 rotates relative to the cam disc 27, with the journals 49, 50 sliding on the surface of the inner ramp 46 and the surface of the outer ramp 48 as on an oblique plane and the holder 37 being displaced in the direction of the centre line 53 on the axle 34. If the adjusting ring 40 is rotated in the clockwise direction viewed from the left in the view of FIG. 6, the axial spacing between the hysteresis ring 28 and the magnetic element 29 or the air gap 30 increases and the torque or braking torque acting on the yarn becomes smaller. In the case of a rotation in the opposite direction, the holder 37 is axially moved by the magnetic force acting as a restoring force and the air gap 30 becomes smaller. The air gap 30 which has become smaller leads to a greater torque or braking torque. To calibrate the magnetic hysteresis brake 26, the procedure is similar to the calibration process already described in conjunction with the design of the magnetic hysteresis brake 1. The cover 41 is initially fixed by means of the hexagon socket screw 42 on the axle 34. The adjusting ring 40 is adjusted such that the marking of the cover 41 points to a specific position of the scale of the adjusting ring 40. The inner socket hexagonal screw 42 is now released until the cover 41 can be rotated about the axle 34. By rotating the adjusting ring 40, the braking torque generated by the magnetic hysteresis brake 26 is changed. A connection configured as a latching device between the adjusting ring 40 and cover 41 also rotates the cover 41 synchronously when the hexagon socket screw 42 is released, so the selected adjustment of the marking is maintained at the specific position. The torque or braking torque input for this specific position is precisely adjusted with the aid of a torque measuring device, not shown. The hexagon socket screw 42 is tightened again and the cover 41 is fixed on the axle 34 again. The allocation of the input torque or braking torque to the specific position has now taken place and the magnetic hysteresis brake 26 is calibrated.

The mechanical device present in a magnetic hysteresis brake according to the invention for changing the braking torque is thus suitable both to adjust the braking torque to a desired value for the operation of the magnetic hysteresis brake and to adjust the braking torque during calibration.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Method for adjusting a braking torque of a permanently excited magnetic hysteresis brake by means of a mechanically acting actuator, characterised by providing only a single actuator (18, 40) for adjustment of the braking torque and a cover (20, 41) associated with the actuator, and by the steps of making both operational adjustment of the braking torque to a desired valued for the operation of the magnetic hysteresis brake (1, 26) and fine calibrational adjustment of the braking torque when calibrating the magnetic hysteresis brake (1, 26) via the single actuator (18, 40), wherein the single actuator (18, 40) entrains the cover (20, 41) when the actuator (18, 40) is rotated for fine calibrational adjustment of the braking torque and the actuator (18, 40) rotates relative to the cover (20, 41) for operational adjustment of the braking torque.

2. Permanently excited magnetic hysteresis brake, comprising a support roller (7, 32) rotatable about a fixed axle (9, 34), at least one magnetic element (3, 29), at least one hysteresis element (2, 28), the magnetic element (3, 29) and the hysteresis element (2, 28) being separated from one another by an air gap (4, 30), an adjusting device for adjusting the position of the magnetic element (3, 29) and hysteresis element (2, 28) relative to one another to apply a correspondingly adjusted braking torque to the support roller (7, 32), the adjusting device comprising an actuator (18, 40) rotatable about the axle (9, 34), characterised in that the magnetic hysteresis brake (1, 26) has only a single actuator (18, 40) for adjusting the braking torque both for operational adjustment of the braking torque to a desired valued for the operation of the magnetic hysteresis brake (1, 26) and for fine calibrational adjustment of the braking torque during the calibration of the magnetic hysteresis brake (1, 26), the magnetic hysteresis brake (1, 26) comprising a cover (20, 41) and a coupling (23) between the cover and the actuator (18, 40), the coupling being operatively arranged for entraining the cover (20, 41) to rotate with the actuator (18, 40) when the actuator is rotated about the axle (9, 34) for fine calibrational adjustment of the braking torque, and the coupling being operatively arranged for permitting the actuator (18, 40) to rotate relative to the cover (20, 41) for operational adjustment of the braking torque.

3. Magnetic hysteresis brake according to claim 2, characterised in that the actuator (18, 40) has a scale (22) and in that the cover (20, 41) carries a marking (25), and in that the scale (22) and the marking (25) are arranged to cooperate as a display device.

4. Magnetic hysteresis brake according to claim 3, characterised in that the magnetic hysteresis brake (1, 26) has a releasably fixed connection between the cover (20, 41) and the axle (9, 34), for selective release or fixation as a function of the respective adjustment process.

5. Magnetic hysteresis brake according to claim 4, characterised in that the fixed connection between the cover (20, 41) and axle (9, 34) is a screw connection.

6. Magnetic hysteresis brake according to claim 3, characterised in that the coupling between the cover (20, 41) and the actuator (18, 40) is configured as a latching device.

7. Magnetic hysteresis brake according to claim 2, characterised in that the actuator (18, 40) is an adjusting ring (18, 40).

8. Magnetic hysteresis brake according to claim 2, characterised in that the hysteresis element (2) is rigidly connected to the support roller (7) and the magnetic element (3) is fastened to a holder (13), which is rotationally fixed with respect to the fixed axle (9) and displaceable relative to the hysteresis element (2) by means of the adjusting device in the axial direction of the fixed axle (9).

9. Magnetic hysteresis brake according to claim 8, characterised in that the actuator (18) and the holder (13) have threads which mesh with one another for axial displacement of the holder (13) via rotation of the actuator (18).

10. Magnetic hysteresis brake according to claim 2, characterised in that the hysteresis element (28) is rigidly connected to the support roller (32) and the magnetic element (29) is fastened to a holder (37), which is rotatable about the fixed axle (34) and rotationally coupled to the actuator (40) for displacement by means of the adjusting device relative to the hysteresis element (28) in the axial direction of the axle (34).

11. Magnetic hysteresis brake according to claim 10, characterised in that the adjusting device comprises a cam disc (27) carried by the axle (34), in that the cam disc (27) has at least one ramp (46, 48), in that the holder (37) is supported on the ramp (46, 48) and in that the cam disc (27) is configured and arranged for axial displacement of the holder (37) via rotation of the holder (37).

12. Magnetic hysteresis brake according to claim 11, characterised in that the surface of the ramp (46, 48) extends helically about the axle (34).

13. Magnetic hysteresis brake according to claim 2, characterised in that the air gap (4, 30) between the magnetic element (3, 29) and the hysteresis element (2, 28) lies in a plane transverse to the fixed axle (9, 34).

* * * * *